United States Patent [19]

Bryant et al.

[11] 4,246,999
[45] Jan. 27, 1981

[54] GRAIN CUP

[75] Inventors: James G. Bryant; Edmund P. Taylor, both of Greencastle, Ind.

[73] Assignee: Bryant Poff Inc., Coatesville, Ind.

[21] Appl. No.: 940,621

[22] Filed: Sep. 8, 1978

[51] Int. Cl.³ .......................................... B65G 17/36
[52] U.S. Cl. .................................................... 198/713
[58] Field of Search .............. 198/307, 509, 701, 702, 198/703, 711, 712, 713, 714, 716; 37/69, 141 R, 192 R

[56] References Cited

U.S. PATENT DOCUMENTS

| | | |
|---|---|---|
| 148,429 | 3/1874 | Duc, Sr. . |
| 180,809 | 8/1876 | Whittaker . |
| 221,207 | 11/1879 | Avery . |
| 288,197 | 11/1883 | Ackerly .............................. 198/713 |
| 435,547 | 9/1890 | Robinson ............................ 198/509 |
| 1,559,004 | 10/1925 | Rattigan .......................... 198/509 X |
| 2,004,632 | 6/1935 | Schauer . |
| 2,122,036 | 6/1938 | Lindburg . |
| 2,185,557 | 1/1940 | Koser .................................. 198/713 |
| 2,301,728 | 11/1942 | Kozak et al. ........................ 198/711 |
| 2,501,229 | 3/1950 | Lindfors . |
| 2,908,375 | 10/1959 | Hoover et al. . |
| 3,381,796 | 5/1968 | Gregor . |

FOREIGN PATENT DOCUMENTS

| | | | |
|---|---|---|---|
| 700162 | 12/1964 | Canada .................................... 198/713 |
| 1805526 | 2/1970 | Fed. Rep. of Germany ........... 198/701 |
| 101521 | 10/1923 | Switzerland . |
| 728419 | 4/1955 | United Kingdom . |
| 1023460 | 3/1966 | United Kingdom . |

Primary Examiner—Jeffrey V. Nase
Attorney, Agent, or Firm—Woodard, Weikart, Emhardt & Naughton

[57] ABSTRACT

A grain cup for use with the conveyor belt of a grain elevator includes two oppositely disposed, flat side panels which are perpendicularly joined with a flat rear panel. Joined between the two side panels and extending upwardly from the base of the rear panel is a forward panel which has two separately curved portions. A first portion is of a part-cylindrical shape having a constant curvature about a first axis and the forward panel includes a leading edge having a constant curvature about a second axis. The second portion is also part-cylindrical and has a constant curvature about a third axis. This third axis being at an acute angle relative to the first axis. The grain cup is fabricated as a single integral member out of polyethylene and includes a series of vent holes in the leading panel and adjacent the rear panel for facilitating the scooping of grain into the cup.

15 Claims, 6 Drawing Figures

GRAIN CUP

BACKGROUND OF THE INVENTION

This invention relates in general to conveyor belt material-transporting containers and in particular to grain cups for use with grain elevators.

One essential category of equipment for the grain and feed industry is bucket elevators. Such elevators are used to move grain from an initial deposit point at or near ground level to a distribution point at some height above ground level. The deposit point may be, for example, where a farmer makes his delivery to a grain elevator and the distribution point may be, for example, the starting point of the grain-processing cycle at the elevator. At the deposit point, the grain is accumulated in a housing through which an endless conveyor belt passes. By providing containers on this endless conveyor belt, the grain is scooped up and carried to a higher point. As a container reaches a top dead center position with respect to the conveyor belt path and begins its downward travel, the grain in the container is discharged into a head portion which is in communication with the distribution point. This discharging of the grain involves a type of throwing action and one important design consideration is how to structure the particular containers to achieve a complete, yet smooth and continuous grain discharge.

Further design considerations involve the capacity of the containers, their durability and the rate at which they can move through the conveyor belt cycle. Due to the fact that the conveyor belt is enclosed by a transport tube, container capacity is constrained by the inside diameter size of this tube. Although the containers could be made deeper to increase their capacity, this may cause failure to completely discharge the grain. A larger container takes longer to empty and the cycle time must be adjusted with container volume considered. Consequently, grain containers of the type described herein must reach a critical balance between such competing factors as material choice, size, conveyor cycle rate and geometry in order to provide the optimal capacity to the elevator, a figure expressed in bushels per hour.

The following listed patents describe various container and elevator bucket designs which have been conceived over the years, and although these designs have been patented, none provide the combination of features which are necessary for an optimal grain cup design.

| U.S. Pat. No. | Patentee | Issue Date |
| --- | --- | --- |
| 148,429 | Duc, Jr. | 3/10/74 |
| 180,809 | Whittaker | 8/08/76 |
| 221,207 | Avery | 11/04/79 |
| 2,004,632 | Schauer | 6/11/35 |
| 2,122,036 | Lindburg | 6/28/38 |
| 2,501,229 | Lindfors | 3/21/50 |
| 2,908,375 | Hoover et al. | 10/13/59 |
| 3,381,796 | Gregor | 5/07/68 |
| 1,023,460 | Gr. Britain | 3/23/66 |
| 728,419 | Gr. Britain | 4/20/55 |
| 101,521 | Jonckheere (Switzerland) | 10/01/23 |

Duc, Jr. discloses a part-spherical elevator bucket fabricated of metal and providing a shape wherein the cubic contents is greater in proportion to the amount of material used than with other shapes.

Whittaker discloses an elevator bucket having a greater bulge at the center of the front than at the sides thereby freeing the bucket from a tendency to catch the side of the trough or casing through which it travels.

Avery discloses an elevator bucket fabricated of a single piece of sheet metal and having a flat bottom, curved sides and front and a flat back. The forward edge of the bucket being below the rear edge when the bucket is attached to a conveyor belt.

Schauer discloses a bucket design, and although the intended use is for dredging machines, this design is of interest for its disclosure of a relatively sharp leading edge portion which permits the bucket to "cut" through the material to be excavated.

Lindburg discloses an elevator cup having a plurality of different angular sections, comprising the bottom of the cup, in order to facilitate progressive discharge of the contents.

Lindfors discloses a grain elevator bucket wherein a corner portion of each end is turned inwardly into the bucket in order to provide an air escape path as grain is scooped up.

Hoover et al. discloses a lemon feeder and although this is significantly different art from that of the present invention, this patent is cited for its disclosure of the cup designs. These cups include a front portion arranged as a polyhedral and a bottom surface sloping downwardly from the rear to front.

Gregor discloses a molded pivot bucket for a conveyor wherein the bucket is fabricated as a single integral member out of a synthetic plastic material such as polypropylene.

The first Great Britain patent (No. 1,023,460) discloses an elevator bucket wherein the front portion is curved upwardly and outwardly, and when attached to a conveyor belt, the forward edge is below the rear edge.

The other Great Britain patent (No. 728,419) discloses a bucket for use with an endless conveyor belt wherein the bucket is fabricated from a synthetic resin material and has a raised area on each side panel in order to increase capacity of the bucket.

The Jonckheere patent discloses a container design having a generally rectangular top view and an outwardly flared "U" shape in lateral cross section.

Designs such as that of Duc, Jr. and Avery provide a curved front edge as is required to maximize the usage of the available space within the transporting tube. However, the remainder of the design of these buckets is not suitable to provide a smooth and continuous grain discharge. Similarly, designs such as that of Lindburg and Lindfors provide a more suitable lateral section configuration, but their generally rectangular top view makes them unsuitable for maximizing capacity when the cups must pass through a fixed transport tube. Other important features of an optimal grain cup are that it be designed to flex rather than permanently bend, have a plurality of vent holes to allow free entry of grain, have a specific front portion curvature relative to the vertical in order to create a gentle discharge pattern and that this curvature be continuous to assure discharge of the grain contained in the cup. None of the listed patents disclose all of these features and thus none of the listed patents disclose an optimal grain cup configuration. It is not merely a perfunctory step to mix desirable features from several designs into one and thereby create an optimal cup configuration. Each design feature must be tempered with respect to other criteria and features and only by a balancing of such features can an optimum cup configuration be achieved. The subject invention disclosed herein provides such an optimal balancing.

SUMMARY OF THE INVENTION

A grain cup for use with the conveyor belt of a grain elevator according to one embodiment of the present invention comprises two oppositely disposed, flat side panels oriented substantially parallel to a first axis, a flat rear panel joined to the two side panels and being oriented substantially parallel to the first axis, a forward panel being joined to the rear panel and to the two side panels and having a leading edge of a constant curvature about the first axis, the forward panel being curved in part between said rear panel and said leading edge with a constant curvature about a second axis and the first and second axes being perpendicular to each other.

One object of the present invention is to provide an improved grain cup design.

Related objects and advantages of the present invention will be apparent from the following description.

DESCRIPTION OF THE PREFERRED EMBODIMENT

Figure 1:
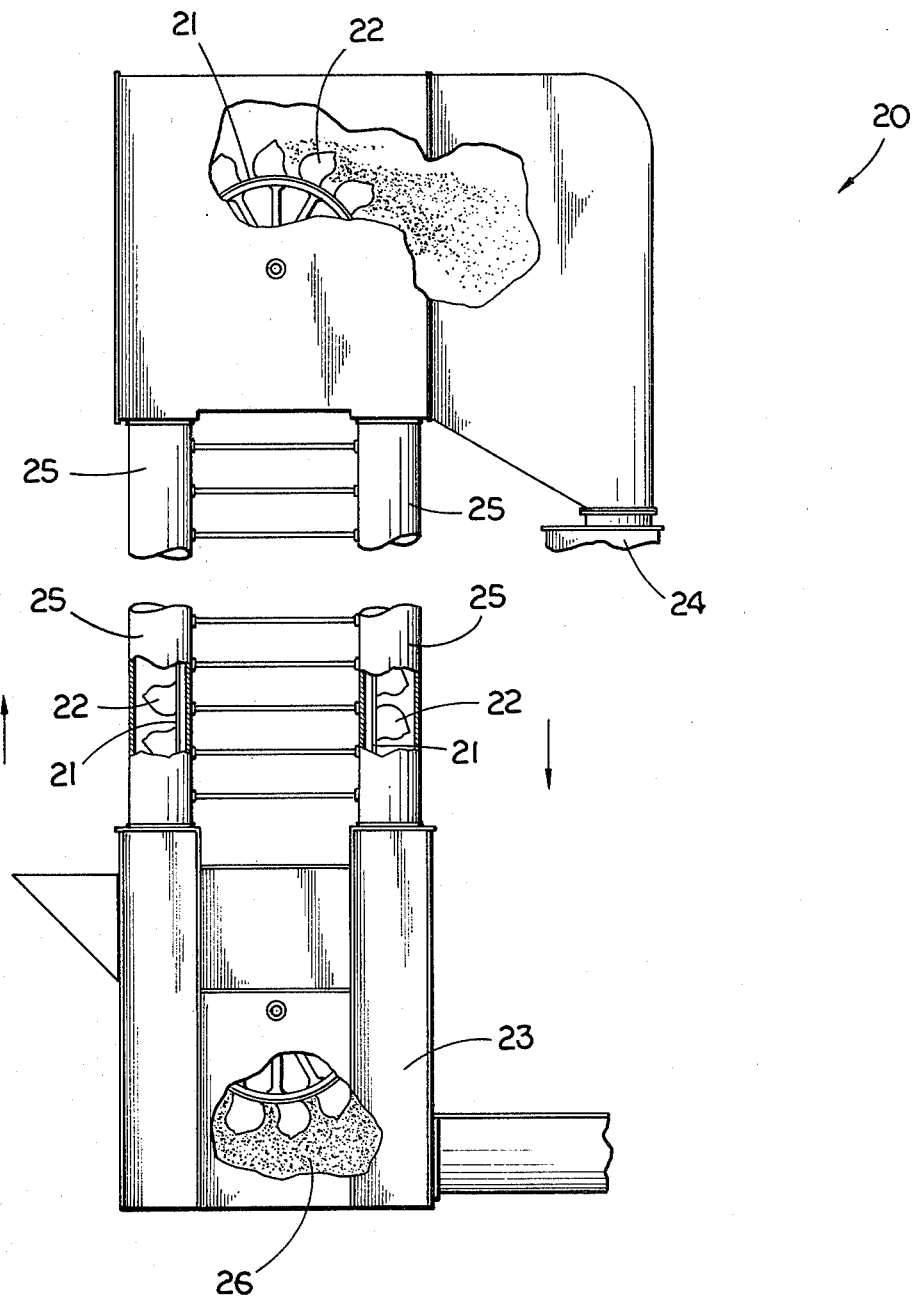
FIG. 1 is a partial side elevation view of a grain elevator conveyor to which grain cups according to a typical embodiment of the present invention are attached.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a grain elevator 20 which includes an endless conveyor belt 21, a plurality of evenly spaced grain cups 22 attached to belt 21, a grain reservoir 23 and a grain distribution point 24 located at an elevation above that of the reservoir 23. By the use of elevator 20, grain which is deposited in reservoir 23 may be carried to a higher elevation from which point it continues on for processing. Belt 21 and cups 22 are enclosed within transport tubes 25 which extend over a majority of the path between reservoir 23 and distribution point 24, and thus the inside diameter of these transport tubes must be considered when designing a system for maximum capacity in terms of bushels per hour of grain which can be moved without compromising the reliability and durability of the overall system.

One important design concern for elevator 20 involves the power requirement for driving conveyor belt 21. Since there is a need to pull each of the grain cups 22 through the grain 26 which is within reservoir 23, the easier that cups 22 can pass through this grain as they pick up a load, the less will be the power demand for the overall elevator. Consequently, the design of the cups as to material, size and contour become extremely important factors to the overall system. Another design concern is how to structure the grain cups 22 so that the discharge of the grain is not in one wad, but rather leaves in a more gradual, continuous fashion such that grain falls on top of other grain instead of hitting a hard metallic surface such as steel. The grain discharge pattern must be selected so as to be compatible with the geometry of the grain-collecting area of the distribution point to assure that the grain falls on grain. Again, it is also important that the design provide a complete discharge of the cups. The conveyor belt speed also affects this discharge pattern in that with a faster conveyor speed, the grain will have a tendency to be catapulted out farther, but the cups will also pass by faster allowing less time for discharge into the distribution point. With a fixed belt speed such as 800 feet per minute, the elevator capacity is controlled by cup size as well as by cup spacing along conveyor belt 21. Thus, it can be seen that all of the various design parameters have some degree of interplay with each other and that the cup design is only one factor to be considered. However, inasmuch as the majority of the structural components of grain elevator 20 are of a permanent nature, large in size and not easily modified or replaced; the one area for relatively inexpensive elevator improvements is in the area of cup 22 modifications, design changes and spacing along the conveyor belt.

Grain cup 22 which is fully detailed by FIGS. 2-5 is similar in certain respects to other cups or buckets which have found some acceptance in the grain-handling and grain-processing industry. However, experience with actual operating elevator systems has shown that different grain cup parameters have different effects on one or more of the desired performance indicators. For example, a grain cup, such as cup 22, which is of a single-piece molded polyethylene construction is light in weight, durable, inexpensive to manufacture and easily modified by merely altering the mold. Furthermore, upon impact with a rigid surface, cups 22 are able to flex and yield while absorbing the impact rather than bending and taking a permanent set as is the case with metal. However, one disadvantage with this type of construction is that a plastic cup must have a greater wall thickness than that of a steel cup or a cup fabricated out of a similar hard metal, in order to have sufficient strength, and as a result, plastic cups will not cut through the grain 26 in the grain reservoir 23 as easily as would a metal cup with a thinner wall. Thus the use of plastic cups requires a smaller cup volume capacity and/or a greater power demand from the elevator and/or an edge design which offsets this increased thickness in order to maintain a desired conveyor belt speed. Related cup parameters include the size and shape contour and these parameters affect the volume of grain which may be carried by a single cup as well as the grain discharge pattern as a cup passes the top dead center point at the top of the conveyor belt path and begins to "fling" the grain outwardly. It is the specific combination of features of grain cup 22 which achieve an optimum result not heretofore attained by earlier grain cup designs.

Figure 2:
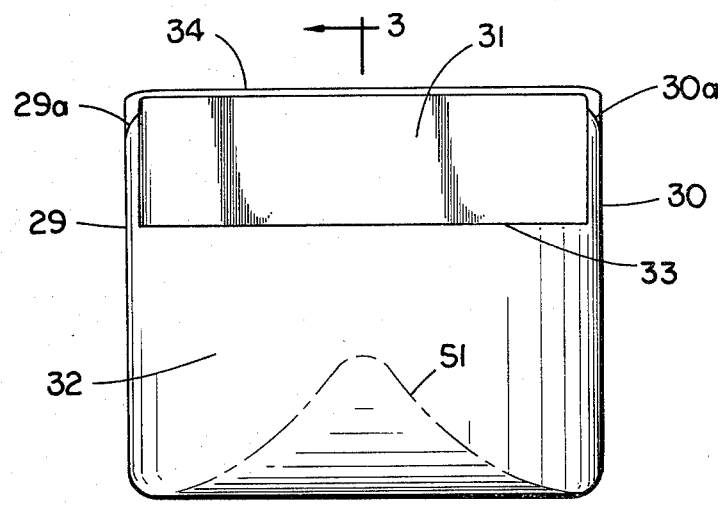
FIG. 2 is a front elevation view of a FIG. 1 grain cup.

Referring to FIG. 2, grain cup 22 is illustrated as having two oppositely disposed flat side panels 29 and 30, a flat rear panel 31 and a forward panel 32. Although in the preferred embodiment these panels are molded together as a single integral member, it is also possible to construct such panels as individual parts out of virtually any material and then join them together by a suitable joining technique appropriate for that particular material. The leading edge 33 of forward panel 32 is vertically located below the uppermost edge 34 of rear panel 31. Side panels 29 and 30 each include a corresponding wing portion 29a and 30a, respectively, which extends slightly above the uppermost edge 34. The top periphery of each side panel 29 and 30 is provided with a reduced thickness portion tapering from the exterior surface inwardly into a sharp edge. This edge as well as the tapering curvature facilitates the movement of grain cup 22 through the grain 26 which is within reservoir 23.

Figure 3:
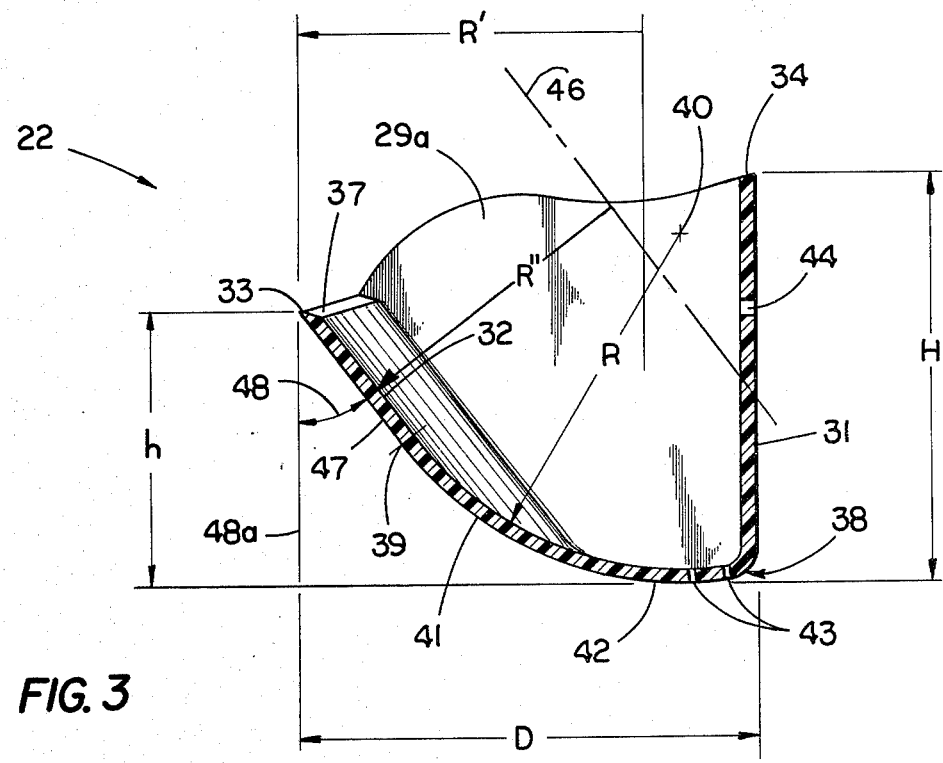
FIG. 3 is a full section view of the FIG. 2 grain cup as taken along line 3—3 in FIG. 2.

The interior as well as the side view geometry of grain cup 22 is best illustrated by FIG. 3. Grain cup 22 is oriented in FIG. 3 as it would be when mounted to a vertical portion of conveyor belt 21 after the cup has picked up a load of grain and is in its upward travel towards the top dead center point at the top of the conveyor loop. The relationship between leading edge 33 and uppermost edge 34 is shown as well as the specific contour of said panel 29 and wing portion 29a. It is to be understood that side panel 30 is virtually identical to side panel 29 with the exception of those obvious differences between left side and right side parts. Leading edge 33 is slightly tapered with an inwardly and downwardly directed incline 37 such that leading edge 33 is tapered outwardly to a reduced thickness thereby serving as a cutting edge to facilitate passage of grain cup 22 through grain 26. In this manner, those portions of grain cup 22, namely wing portions 29a and 30a and leading edge 33, which first contact grain 26 have a tapered edge design. Thus the wall thickness of cup 22, which must be greater than that of a metal cup for the required cup strength and durability, does not have an adverse effect on passage of the cup through grain 26.

Forward panel 32, although continuous in nature, actually consists of two differently contoured portions. Each portion is configured of a part-cylindrical shape, but with differently oriented cylindrical axes. The first portion extends from corner 38 upwardly and outwardly to point 39 which is approximately half way up forward panel 32. This first portion has a constant and continuous curvature of an approximate six-inch radius (indicated as R) originating at horizontal axis line 40 which is approximately 1.06 inches (26.9 mm) out from rear panel 31. It should be understood that the specific dimensions referred to are for a single specific size and cup 22 is able to be correspondingly scaled up as well as down with the dimensions changing accordingly. First portion 41 has this constant curvature throughout its entire width extending from side panel 29 to side panel 30, and this constant curvature is not compound. That is, the shape of first portion 41 between side panel 29 and side panel 30 is part cylindrical. Positioned in the lowermost portion 42 of first portion 41 is a plurality of vent holes 43 which extend in an evenly spaced, two-row series the full width of cup 22 between side panel 29 and side panel 30. These vent holes facilitate the ease of grain entry into cup 22 without reducing the grain holding volume of the cup by allowing air which is trapped between the cup and the grain to escape. This results in a smoother grain pickup and a more complete loading of the cup as it "cuts through" the reservoir 23 of grain 26. The vent holes also facilitate complete discharge of the grain from the cups. Also, rear panel 31 is provided with three evenly spaced mounting holes 44, only one of which is shown in FIG. 3, and these mounting holes are used to attach cup 22 to a suitable conveyor belt (see FIG. 6).

The second portion 47 of forward panel 32 is not of a curved section in this side elevation view but is rather a straight line and extends to and joins with first portion 41 much as a tangent line joins to a circle. The specific angular relationship between second portion 47 and the remainder of grain cup 22 is important in that the geometry controls the pickup of grain from reservoir 23 as well as influencing the discharge pattern of the grain from the cup. Second portion 47 is arranged with respect to rear panel 31 with an included angle 48 therebetween of approximately 38 degrees. For drawing clarity, this included angle 48 is illustrated between second portion 47 and a corresponding vertical line 48a which intersects the outermost tip of leading edge 33. Another factor which is important to the overall operation and performance of grain cup 22 is the specific dimensional relationship between the various panels. Although it is understood that the size of grain cup 22 could be increased or decreased according to the conveyor system and grain elevator with which it is used, the dimensional proportionalities and relationships should remain the same regardless of size increase or decrease. For example, the overall height indicated by letter H should be between 80% and 90% of the overall width of grain cup 22 indicated by letter W in FIG. 5. Similarly, the leading edge height, indicated by letter h, should be between 60% and 70% of the overall height (H). Also, the overall depth from rear panel 31 to leading edge 33 as indicated by letter D should be virtually the same as the overall width (W) of grain cup 22. Similarly, the location of horizontal axis line 40, the radius of curvature of first portion 41 and the angular relationship between second portion 47 and rear panel 31 should be preserved with any size increase or decrease.

Figure 4:
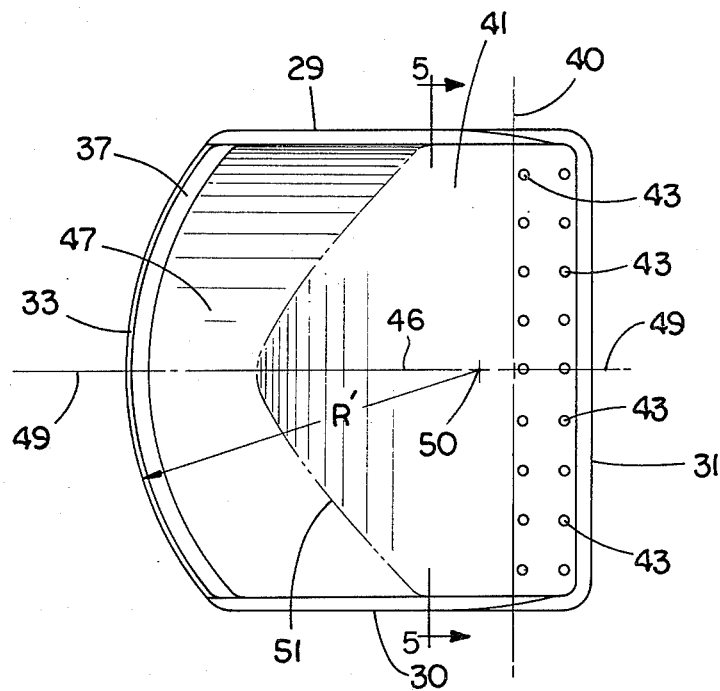
FIG. 4 is a plan view of the FIG. 2 grain cup.
Figure 5:
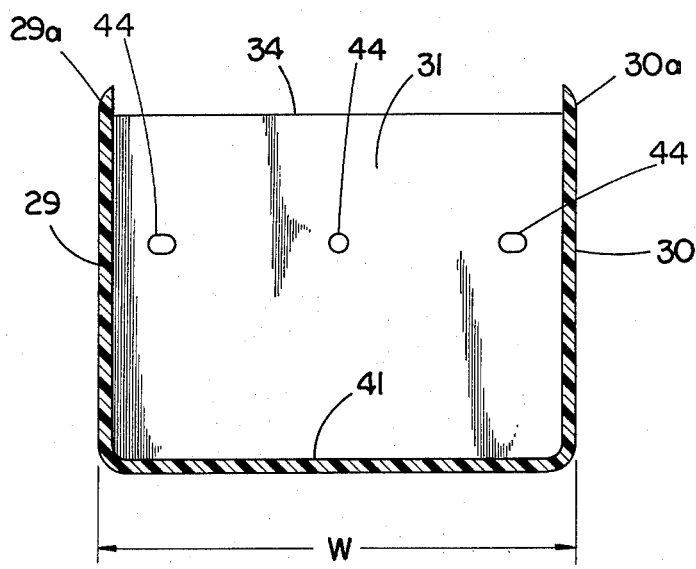
FIG. 5 is a full section view of the FIG. 2 grain cup as taken along line 5—5 in FIG. 4 and turned 90 degrees.

Referring to FIG. 4, a plan view of grain cup 22 is illustrated and this view must be considered in detail with respect to the cross-sectional configuration of FIG. 3 in order to appreciate the curvature relationships between the first portion 41 and second portion 47. It can been seen by this illustration that panels 29, 30 and 31 are arranged into a block U-shaped configuration. Although second portion 47 has previously been described as a straight line or flat surface forming an approximate 38 degree angle with the vertical, that specific geometry is only applicable with respect to a cutting plane which is parallel to side panels 29 and 30 and perpendicular to rear panel 31. Consequently, any one of a series of such vertical cutting planes will produce a cross-sectional configuration for second portion 47 similar to that illustrated in FIG. 3. The only difference is that as the cutting plane moves to either side of midline 49, the dimension from the outermost point of leading edge 33 to the rear panel 31 will decrease as leading edge 33 curves toward either side panel. In fact, leading edge 33 has a constant and continuous curvature (indicated by R') with respect to a horizontal plane which is perpendicular to vertical axis line 50 and extends completely across grain cup 22 joining side panel 29 on one side to side panel 30 on the opposite side. Second portion 47 is generally part-cylindrical and this part-cylindrical shape begins at leading edge 33 and extends downwardly at the 38 degree incline of angle 48 to the point of intersection with first portion 41. The part-cylindrical shape of second portion 47 is oriented about axis line 46 which is substantially parallel to the straight line edge geometry of portion 47 (in section) as illustrated in FIG. 3. Axis line 46 is inclined relative to the vertical at an included angle equal in magnitude to angle 48. The inside surface of portion 47 is spaced from axis line 46 by a distance indicated by R". The tapered surface 37 of leading edge 33 is also illustrated in FIG. 4 and the plurality of vent holes 43 is shown in greater detail as they extend from side panel 29 to side panel 30 in the lowermost portion 42 of first portion 41. The relative positions of horizontal axis line 40 and vertical axis line 50 are also illustrated. Axis line 50 is approximately 2.0 inches (50.8 mm) out from the rear surface of rear panel 31. Broken line 51 represents the interface line between first portion 41 and second portion 47, and an appreciation of the respective geometries of these two portions will reveal that this broken line 51 is actually the line of intersection between two generally part-cylindrical surfaces. The first part-cylindrical surface is defined by first portion 41 and its constant curvature about horizontal axis line 40 and the second generally part-cylindrical surface is defined by second portion 47 and its constant curvature about inclined axis line 46. The angular relationship between these two generally part-cylindrical surfaces is governed by the included angle 48 between second portion 47 and the corresponding vertical line. Consequently, second portion 47 can be visualized as being curved about third axis line 46 which lies in the same vertical plane (mid line 49) as axis line 50 yet is at an acute angle (angle 48) with respect to line 50. Broken line 51 is also indicated in FIG. 2 wherein it represents the exterior view of this interface between the first and second portions of forward panel 32. It is the specific contour of first portion 41 and second portion 47 and the relationship between these two and with the remainder of the grain cup which facilitate grain cup 22 to function in an optimal manner. As the cups pass through the grain 26 in grain reservoir 23, leading edge 33 and second portion 47 are oriented downwardly into the grain which permits maximum pickup and as the grain cup moves upwardly on the first leg of its path. The grain which is scooped up will be held within grain cup 22 until such time as the cup begins to pass over the top dead center point at the top of the conveyor belt loop. At this point, the curvature of first portion 41 and second portion 47 facilitate a particular catapulting discharge pattern of the grain in a smooth and continuous manner flinging the grain into a collection member associated with distribution point 24. Also contributing to the gemometric relationship between first portion 41 and second portion 47 is the fact that the radius dimension of first portion 41 from horizontal axis line 40 is virtually the same as the radius of curvature of leading edge 33 from vertical axis line 50.

Figure 6:
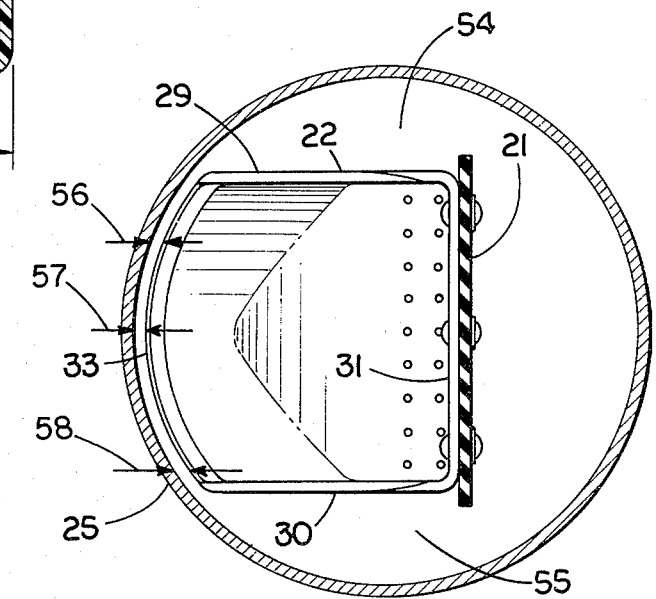
FIG. 6 is a plan section view of a transport tube with conveyor belt and grain cup included.

As previously discussed, the plan view geometry of grain cup 22 must be considered with respect to the fact that such cups as well as the conveyor belt pass through generally cylindrical transport tubes 25. FIG. 6 is a plan view of the positioning of belt 21 and grain cup 22 within tube 25. Although a slight side clearance is left between belt 21 and tube 25, belt 21 is basically oriented as a chord of the inside diameter circle of tube 25. Consequently, it is the larger area to the left of belt 21 (in FIG. 6) which is available for cup 22. By forming leading edge 33 with a constant curvature corresponding to some extent with the curvature of tube 25, usage of this available area is increased over that of a cup design with a straight leading edge which is parallel to rear panel 31. Although it would increase the utilization of this available area if the side panels of cup 22 were extended out into areas 54 and 55, there are reasons why side panels 29 and 30 are flat and perpendicular to rear panel 31. The particular contour of these sides with respect to the remainder of the grain cup provides strength to the cup as the cup passes through the grain and provides a preferred arrangement for directing the discharge of grain from the cup.

Referring to FIG. 6 it should be noted that the distance between the cups 22 and the transport tube 25 taken perpendicular to belt 21 is constant as indicated by the arrows 56, 57 and 58. The reason for this equal spacing is to provide for flopping of the cups as the belt moves back and forth. For example, even the lap joint of the belt causes such flopping. The reason for this design of the equal distances 56, 57 and 58 is to provide maximum cup capacity by utilization of corner areas.

While the invention has been illustrative and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A grain cup for use with the conveyor belt of a grain elevator, said grain cup comprising:
   two oppositely disposed, flat side panels oriented substantially parallel to a first axis;
   a flat rear panel joined to said two side panels and being oriented substantially parallel to said first axis; and
   a forward panel joined to said rear panel and to said two side panels and having a leading edge of a constant curvature about said first axis, the section of said forward panel disposed between said leading edge and said rear panel being arranged solely into only two constant curvature portions, one of said constant curvature portions beginning at said rear panel and extending toward said leading edge, the constant curvature of said one constant curvature portion being established about a second axis, said first and said second axes being perpendicular to each other, the other one of said two constant curvature portions being curved solely about a third axis, said third axis being at an acute angle with respect to said first axis.

2. The grain cup of claim 1 wherein said forward panel being arranged with a plurality of spaced apart vent holes disposed therein adjacent said rear panel, said plurality of vent holes extending for substantially the full width of said rear panel between said side panels.

3. The grain cup of claim 1 wherein said other of said two separate portions having a substantially flat cross-sectional configuration relative to any one of a series of first cutting planes, each one of said series of said first cutting planes being parallel to said side panels.

4. The grain cup of claim 3 wherein said other of said two separate portions being inclined relative to said rear panel with an included angle of between 36 degrees and 40 degrees.

5. The grain cup of claim 4 wherein said leading edge being contoured with an inwardly sloping surface, said leading edge having its minimum thickness at its outermost portion.

6. The grain cup of claim 5 wherein said two flat side panels each having winged portions extending above the uppermost part of said rear panel and said forward panel.

7. The grain cup of claim 6 wherein said forward panel being arranged with a plurality of vent holes therein adjacent said rear panel.

8. The grain cup of claim 7 wherein each of said panels having a specific dimensional relationship to each other, said rear panel having a height dimension equal to between 80% and 90% of its width dimension, said overall length from rear panel to said leading edge being substantially equal to the width of said rear panel between said two side panels, said forward panel having a height for its leading edge of between 60% and 70% of the height of said rear panel.

9. The grain cup of claim 8 wherein said entire grain cup being molded as a single integral member out of polyethylene.

10. A grain cup for use with the conveyor belt of a grain elevator, said grain cup comprising:
two oppositely disposed, flat side panels oriented substantially parallel to a first axis;
a flat rear panel joined to said two side panels and being oriented substantially parallel to said first axis;
a forward panel being joined to said rear panel and to said two side panels and having a leading edge of a constant curvature about said first axis, said forward panel being defined by two intersecting part-cylindrical portions arranged between said rear panel and said leading edge, one part-cylindrical portion having a constant curvature about a second axis, said first and second axes being perpendicular to each other, the other part-cylindrical portion having a constant curvature about a third axis, said third axis being at an acute angle relative to said first axis; and
said panels being designed and arranged with a specific dimensional relationship to each other wherein said rear panel has a height dimension equal to between eighty percent and ninety percent of its width dimension, said overall length from said rear panel to said leading edge being substantially equal to the width of said rear panel between said two side panels and said forward panel having a height for its leading edge of between sixty percent and seventy percent of the height of said rear panel.

11. The grain cup of claim 10 wherein said entire grain cup is molded as a single integral member out of polyethylene.

12. The grain cup of claim 10 wherein said forward panel being arranged with a plurality of vent holes disposed therein adjacent said rear panel.

13. A grain cup for use with the conveyor belt of a grain elevator, said grain cup comprising:
two oppositely disposed, flat side panels oriented substantially parallel to a first axis;
a flat rear panel joined to said two side panels and being oriented substantially parallel to said first axis;
a forward panel being joined to said rear panel and to said two side panels and having a leading edge of a constant curvature about said first axis, said forward panel being curved in part between said rear panel and said leading edge with a constant curvature about a second axis, said first and said second axes being perpendicular to each other, said forward panel being arranged into two separate portions, one of said two separate portions being curved solely about said second axis, the other of said two separate portions being curved solely about a third axis, said third axis being at an acute angle with respect to said first axis;
the other of said two separate portions having a substantially flat cross-sectional configuration relative to any one of a series of first cutting planes, each of one of said series of said first cutting planes being parallel to said side panels and said other of said two separate portions being inclined relative to said rear panel with an included angle of between thirty-six degrees and forty degrees;
said leading edge of said forward panel being contoured with an inwardly sloping surface such that said leading edge has its minimum thickness at its outermost portion;
said two flat side panels each having winged portions extending above the uppermost part of said rear panel and said forward panel;
a plurality of vent holes disposed in said forward panel at a location adjacent said rear panel; and
each of said panels having a specific dimensional relationship to each other, said rear panel having a height dimension equal to between eighty percent and ninety percent of its width dimension, said overall length from said rear panel to said leading edge being substantially equal to the width of said rear panel between said two side panels and said forward panel having a height for its leading edge of between sixty percent and seventy percent of the height of said rear panel.

14. The grain cup of claim 13 wherein said entire grain cup being molded as a single integral member out of polyethylene.

15. A grain cup for use with the conveyor belt of a grain elevator, said grain cup comprising:
three substantially flat wall panels arranged such that two panels are substantially parallel to each other and the third panel is substantially perpendicular to said first two panels and said panels are joined together into a block U-shaped arrangement;
a forward panel joined to said wall panels and arranged to define a grain-carrying void portion therebetween; and
said forward panel being comprised solely of only two intersecting part-cylindrical portions, one portion being curved about an axis which is perpendicular to said two parallel wall panels and parallel to said one perpendicular wall panel, the other portion being curved about an axis which is disposed at an acute angle relative to the surface of said perpendicular wall panel.

* * * * *